Patented July 24, 1934

1,967,360

UNITED STATES PATENT OFFICE 1,967,360

LAKES FROM BASIC DYESTUFFS

Erich Hartmann, Leverkusen-Wiesdorf, and Friedrich Muth, Leverkusen-I. G. Werk, Germany, assignors to General Aniline Works, Inc., New York, N. Y., a corporation of Delaware No Drawing. Application November 25, 1932, Serial No. 644,398. In Germany December 1, 1931

8 Claims. (Cl. 260—18)

The present invention relates to a process of preparing lakes from basic dyestuffs and to the new lakes obtained thereby, more particularly it relates to lakes which have been prepared by means of a heavy metal complex compound of a non-dyeing highmolecular sulfurized phenol compound as precipitating agent.

In the art of producing lakes from basic dyestuffs tannin is used to a large extent as precipitating agent for the said basic dyestuffs. The lakes thus produced, however, show disadvantages in some respects. For example, the dyestuffs at first are completely precipitated upon the substratum, but during the time the precipitated lake is depositing, part of the dyestuff redissolves and can no longer be precipitated by the addition of further tannin. This "bleeding" of the lake can partially be avoided by the addition of tartaric emetic.

According to the present invention these disadvantages are overcome by using as precipitating agent a heavy metal complex compound of a non-dyeing highmolecular sulfurized phenol compound.

The manufacture of our new lakes is in accordance with the art of producing lakes from basic dyestuffs by means of tannin. For example, the new lakes can be prepared by first producing a substratum according to one of the methods known in the art, as is, for example, more fully described in the examples, adding thereto an aqueous solution of a basic dyestuff, and finally precipitating the dyestuff upon the substratum by adding an aqueous solution of a heavy metal complex compound of a non-dyeing highmolecular sulfurized phenol compound in such a quantity that the whole of the dyestuff is precipitated.

It is self-understood that basic dyestuffs precipitated by means of a heavy metal complex compound of a non-dyeing highmolecular sulfurized phenol in the absence of a substratum fall within the scope of our invention.

The heavy metal complex compounds of non-dyeing highmolecular sulfurized phenols have been described in literature, for example, in British Patent 370,458, in which complex tin compounds have been described, further in British Patents 374,928, 365,534 and 375,885, and in French Patent 730,541.

These heavy metal complex compounds used in our invention are generally obtainable by heating a non-dyeing highmolecular sulfurized phenol (see for example U. S. P. 1,450,463, U. S. Reissue-Patent 17,940, reissued January 27, 1931, British Patents 173,313 and 211,108) with a heavy metal included in the hydrogen sulfide group or the ammonium sulfide group in the usual scheme of qualitative analysis, or with a compound of one of the said metals or with mixtures of said metals or compounds thereof. The starting sulfurized thiophenols are generally obtainable by heating phenols free from nitrogen, such as phenol, naphthol and substitution products thereof, for instance, halogen, alkyl and hydroxy derivatives, with sulfur in the presence of an alkali for a prolonged time. The heavy metal complex compounds thereof are further obtainable by heating a phenol other than phenols containing nitrogen with sulfur and a caustic alkali in the presence of a heavy metal of the kind referred to above or a compound, especially a salt, thereof, or by heating a phenol of the kind identified with sulfur chloride in the presence of the heavy metal or metals or compounds thereof.

As heavy metals, the complex compounds of sulfurized phenols of which come into consideration for the purpose of the invention, there may be mentioned by way of example copper, tin, bismuth, cadmium, antimony, chromium, molybdenum, nickel, cobalt, manganese, zinc, aluminum, titanium, vanadium and tungsten. For the purpose of the invention there may be used such heavy metal complex compounds as contain one heavy metal in a complex form, for example, chromium or tin, as well as such compounds which contain more than one heavy metal in a complex form, for example, chromium+tin. It is to be mentioned that in the manufacture of the heavy metal complex compounds those metals causing unfavorable side-reactions should be excluded, for example, lead, which is known as an agent easily combining with sulfur, and therefore taking the sulfur from the reaction mass, or iron, which forms dark colored substances without value for the purpose in question.

The new lakes are various colored substances, insoluble in water, yielding coatings of good fastness to light.

The invention is illustrated by the following examples, without being limited thereto, the parts being by weight:

*Example 1.*—50 parts of heavy spar are made into a paste with 100 parts of water. Then a solution of 10 parts of aluminum sulfate (18% $Al_2O_3$) in 100 parts of water is added, and at about 30° C. a solution of 5 parts of calcined soda in 50 parts of water is slowly introduced, while stirring. Then, while further stirring, a solution of 11 parts of crystallized barium chloride, dissolved in 100 parts of water, are introduced. Then 2 parts of New Victoria blue B (see Colour Index, page 186, No. 728) are dissolved in 400 parts of boiling water, and this solution is added to the substratum above described. In a separate vessel a 10% aqueous solution of 1, 4 parts of the complex tin compound of a sulfurized phenol, prepared according to Example 2 of British Patent 370,458, are dissolved in a ratio of 1:20. This solution is slowly introduced with stirring into the mixture of substratum and solution of dyestuff, whereby the dyestuff is precipitated.

Example 2.—In an analogous manner as described in Example 1 there is prepared a lake consisting of the following components:

100 parts of heavy spar,
2 parts of Victoria Blue (compare Colour Index, page 186, No. 729), and
1 part of the complex chromium compound of a sulfurized phenol, prepared according to the process described in British Patent 360,378; dissolved in a ratio of 1:20.

Example 3.—In an analogous manner as described in Example 1 there is prepared a lake consisting of the following components:

50 parts of heavy spar,
10 parts of aluminium sulfate (18% $Al_2O_3$), dissolved in a ratio 1:10,
5 parts of calcined soda, dissolved in a ratio 1:10,
11 parts of barium chloride, dissolved in a ratio of 1:10,
2 parts of Safranine FF extra (compare Colour Index, page 210, No. 841) 1:100
2 Parts of the complex molybdenum compound of a sulfurized phenol, prepared according to the process described in British Patent 370,458, dissolved in a ratio of 1:20.

Example 4.—In an analogous manner as described in Example 1 there is prepared a lake consisting of the following components:

50 parts of heavy spar,
10 parts of aluminum sulfate (18% $Al_2O_3$), dissolved in a ratio of 1:10
5 Parts of calcined soda, dissolved in a ratio 1:10
11 parts of crystallized barium chloride, dissolved in a ratio 1:10
2 parts of Rhoduline Blue 6G (compare Colour Index, page 168, No. 658) 1:100
15 parts of the complex chromium compound of a sulfurized phenol described in Example 2, dissolved in a ratio of 1:20.

Example 5.—In an analogous manner as described in Example 1 there is prepared a lake consisting of the following components:

50 parts of heavy spar
10 parts of aluminum sulfate (18% $Al_2O_3$), dissolved in a ratio of 1:10
5 parts of calcined soda, dissolved in a ratio of 1:10
11 parts of barium chloride, dissolved in a ratio of 1:10
2 parts of Safranine FF extra (compare Colour Index, page 210, No. 841) 1:100
2 parts of a complex tin compound of a sulfurized phenol, prepared in an analogous manner as described in Example 2 of British Patent 370,458, from 116 parts of technical cresol mixture, 43 parts of caustic soda, 60 parts of sulfur, 20 parts of stannous chloride and 15 parts of chromic fluoride.

Instead of the heavy metal complex compounds of high molecular sulfurized phenols there may be used with the same result other compounds, for example, compounds of sulfurized phenols which contain in a complex form bismuth, antimony, copper or manganese.

We claim:

1. In the process of preparing lakes from basic dyestuffs, the step which comprises precipitating the basic dyestuff by means of a complex compound of a heavy metal of the group consisting of copper, tin, bismuth, cadmium, antimony, chromium, molybdenum, nickel, cobalt, manganese, zinc, aluminium, titanium, vanadium and tungsten with a non-dyeing highmolecular sulfurized phenol compound.

2. In the process of preparing lakes from basic dyestuffs, the step which comprises precipitating the basic dyestuff by means of a complex compound of a heavy metal of the group consisting of copper, tin, bismuth, cadmium, antimony, chromium, molybdenum, nickel, cobalt, manganese, zinc, aluminium, titanium, vanadium and tungsten with a non-dyeing highmolecular sulfurized phenol.

3. In the process of preparing lakes from basic dyestuffs, the step which comprises precipitating the basic dyestuff by means of a complex tin compound of a non-dyeing highmolecular sulfurized phenol.

4. Addition compounds between a basic dyestuff and a complex compound of a heavy metal of the group consisting of copper, tin, bismuth, cadmium, antimony, chromium, molybdenum, nickel, cobalt, manganese, zinc, aluminium, titanium, vanadium and tungsten with a non-dyeing highmolecular sulfurized phenol compound.

5. Addition compounds between a basic dyestuff and a complex compound of a heavy metal of the group consisting of copper, tin, bismuth, cadmium, antimony, chromium, molybdenum, nickel, cobalt, manganese, zinc, aluminium, titanium, vanadium and tungsten with a non-dyeing highmolecular sulfurized phenol.

6. Addition compounds between a basic dyestuff and a complex tin compound of a non-dyeing highmolecular sulfurized phenol.

7. In the process of preparing lakes from basic dyestuffs, the step which comprises precipitating the basic dyestuff by means of a complex chromium compound of a non-dyeing high molecular sulfurized phenol.

8. Addition compounds between a basic dyestuff and a complex chromium compound of a non-dyeing highmolecular sulfurized phenol.

ERICH HARTMANN.
FRIEDRICH MUTH.